April 4, 1939.  P. M. LINCOLN ET AL  2,153,091
THERMAL DEMAND METER
Filed April 30, 1936  3 Sheets—Sheet 1
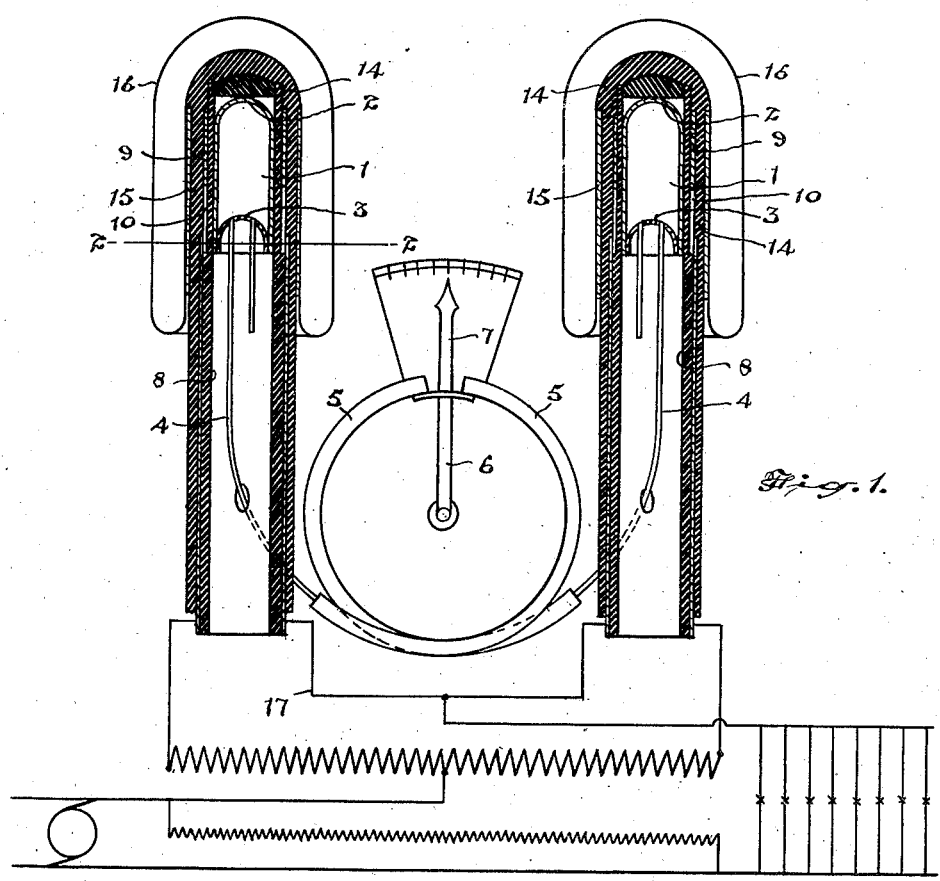
Fig. 1.
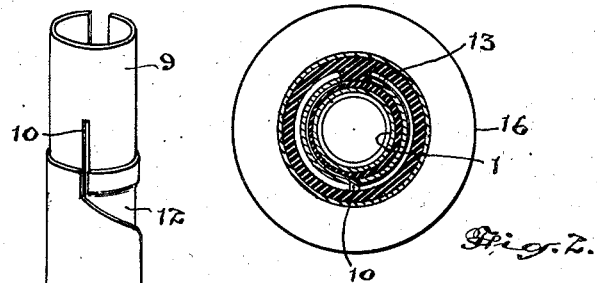
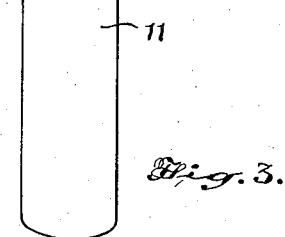
Fig. 3.
Fig. 2.
Fig. 4.
Fig. 5.
Inventors
Paul M. Lincoln.
Robert R. Sprole.
by H. J. S. Dennison
atty.

April 4, 1939.  P. M. LINCOLN ET AL  2,153,091
THERMAL DEMAND METER
Filed April 30, 1936.  3 Sheets-Sheet 2

Inventors.
Paul M. Lincoln.
Robert R. Sprole.

April 4, 1939.  P. M. LINCOLN ET AL  2,153,091
THERMAL DEMAND METER
Filed April 30, 1936   3 Sheets-Sheet 3

Inventors.
Paul M. Lincoln.
Robert R. Sprole.

Patented Apr. 4, 1939

2,153,091

UNITED STATES PATENT OFFICE 2,153,091

THERMAL DEMAND METER

Paul M. Lincoln and Robert R. Sprole, Ithaca, N. Y.; said Sprole assignor to said Lincoln Application April 30, 1936, Serial No. 77,108

12 Claims. (Cl. 171—95)

The principal objects of this invention are to improve the construction of the thermal demand meter so as to reduce to the minimum the errors due to inadequately controlled radiation and convection of heat and to provide a structure in which the rate of heat exchange per degree of temperature difference between the two operating elements will be uniform at various temperature differences.

A further and important feature of the invention consists in producing a structure which is capable of being reproduced in quantities with great accuracy.

The principal features of the invention consist in the novel construction of pressure fluid reservoirs which are connected to a Bourdon tube structure for operating an indicator, and in the novel construction and arrangement of electrical resistances or heaters and the means embracing the same whereby said heaters are maintained in uniform close-engaging contact with said reservoirs, and further, in means applied to said heaters and reservoirs to effect the equalizing and distribution of the heat therein and controlling the dissipation of the heat generated.

A further important feature consists in the novel features of construction and the method of assembly whereby the several elements may be quickly, cheaply and accurately assembled.

In the accompanying drawings, Figure 1 is a longitudinal sectional view made through a pair of cooperative energy-translating members constructed in accordance with this invention, showing diagrammatically their connection with an electric load circuit.

Figure 2 is an enlarged cross sectional view taken on the line 2—2 through one of the translating elements shown in Figure 1.

Figure 3 is an enlarged perspective detail of one of the heating elements as shown assembled in Figure 1.

Figure 4 is an enlarged cross sectional view through one of the heater elements.

Figure 5 is an enlarged cross sectional view through one of the heaters showing the copper conductors.

In the use of thermal type meters there are numerous elements which tend toward error in translating the effect of the transformed electric energy being measured and the present invention has been devised particularly to reduce these uncertain elements to a condition of substantial uniformity.

It has been proposed to translate the effect of heat produced by the flow of electric current into fluid pressure and to operate the designating indicator with such fluid pressure, using "Bourdon" tubes or other means to operate the indicator.

It has also been proposed to enclose the fluid reservoirs, connected with such "Bourdon" tubes and the electric heating elements, within vacuum tubes to reduce error caused by radiation and convection.

The present invention proposes the use of both of these features and incorporated novel constructions and arrangements as hereinafter described.

In the application of the invention herein shown the reservoirs 1 for containing an expansile fluid are preferably formed of steel drawn into tubular form having a rounded closed end 2.

The head 3 for closing the open end of the reservoir is also preferably formed of drawn steel to fit tightly into the end of said reservoir, the edges of the head and reservoir 1 being sealed by welding, brazing or soldering.

Figure 11:
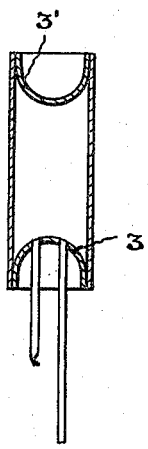
Figure 11 is a longitudinal mid-sectional view of a modified form of fluid reservoir having a double re-entrant head.

The use of a re-entrant type of head for the cylindrical reservoir ensures the presentation of a desirably large cylindrical surface on its exterior, relative to the fluid capacity of the reservoir and this effect may be further enhanced by the use of a double re-entrant head 3 and 3', that is to say, the cylinders may each advantageously comprise a tube with a head inserted at each end as exemplified in Figure 11.

Each reservoir 1 is provided with a capillary tube 4 connected to the head and leading to a "Bourdon" tube 5 which is connected by the operating arm 6 to an indicator spindle 7 operating over a scale 7'.

In the form illustrated in Figure 1 the reservoirs 1 are each inserted into one end of a tube 3 which is preferably formed of vulcanized fibre or other suitable material which will transmit heat generated by thermal meter resistance heaters and not be detrimentally affected thereby.

A resistance member or heater 9 formed of a metal sheet of predetermined resistance value is bent around each tube 8 fitting snugly thereto. These heaters are each formed with a longitudinal slot 10 arranged centrally of the width thereof and extending for the major portion of the length, and conductor strips 11 and 12 preferably of thin sheet copper are secured to the bifurcated ends of the heaters. These copper strips preferably but not necessarily overlap each other and a thin sheet 13 of electric insulating material is inserted between the overlapping portions and extends into the slot 10 of the heater.

Each heater and its attached conductor strips is bound securely against the cylindrical surface of the tube 8 and a covering 14 of a suitable insulating material such as a synthetic resin is moulded thereover to form a unitary insulating cover. It will be further evident that the entire heater structure may be moulded into a single unit of any suitable mouldable plastic material such as "Bakelite".

A sleeve 15 of metal of high heat conductivity, preferably copper, may be arranged to closely surround the insulating cover 13 to encircle the heater 9 and to extend well over the connecting ends of the copper conductors, thus forming a heat conducting member to absorb heat conducted outwardly from the heater and acting as a distributor taking heat from hotter portions of the resistances and distributing it to portions having lesser heat evolution and also conducting outwardly conducted or radiated heat from the heater to the copper conductor strips. The sleeve thus forms a very effective thermal shunt and also acts to maintain the heater assembly in firm physical contact with the reservoirs.

Figure 6:
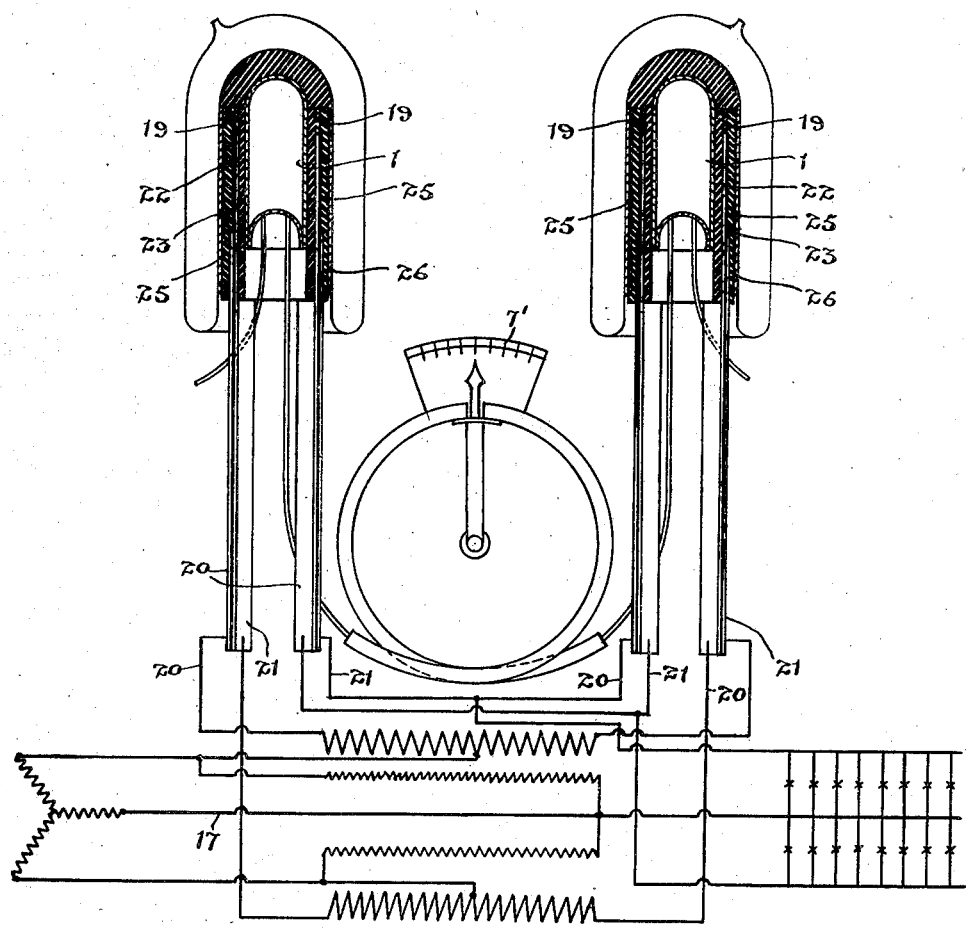
Figure 6 is a view similar to Figure 1 showing a structure as applied to the measurement of a polyphase current.
Figure 8:
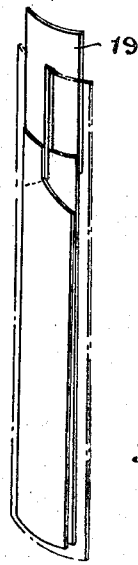
Figure 8 is an enlarged perspective detail of one of the heaters shown in Figure 6.
Figure 9:
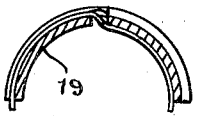
Figure 9 is an enlarged cross section of one of the heaters shown in Figure 6.
Figure 7:
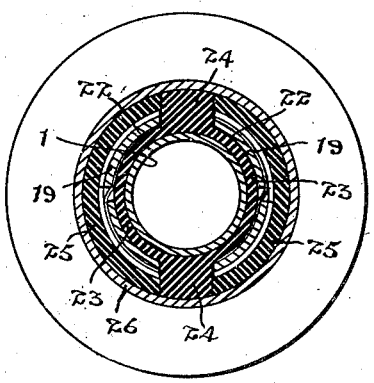
Figure 7 is an enlarged cross section through one of the translating devices shown in Figure 6.
Figure 10:
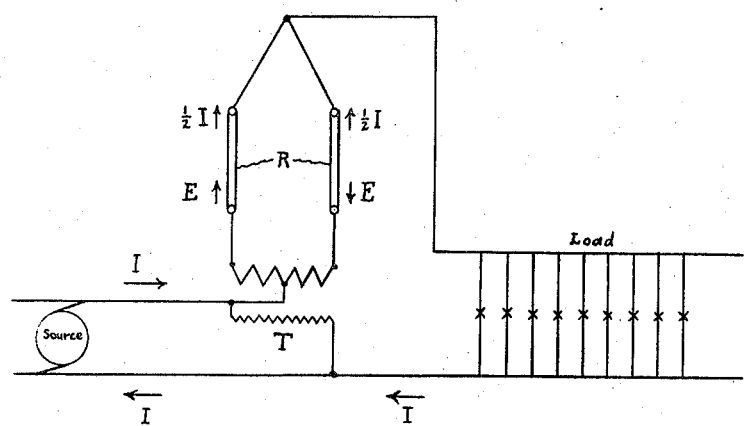
Figure 10 is a diagrammatic view illustrating the fundamental theory of the thermal wattmeter.

Each of the energy translating units constructed as described is arranged with the heater end inserted in a vacuum jacket 16 which retains the heat generated and prevents convection and radiation losses, the only heat conduction from the heaters being through the copper leads, which are connected by suitable wiring to the meter circuit 17, which is of a well known thermal meter type and in Figure 10 there is shown a circuit diagram illustrating the basic theory of the thermal wattmeter which may be briefly referred to as follows:

In the said diagram a source of electrical energy is shown supplying a load. Incorporated within the meter is a small transformer T which has a secondary voltage E. R are two equal resistances through which currents are circulated in the following manner. It is obvious that the voltage E will set up a current through these two resistances which is equal to $$\frac{E}{2R}$$

The load current is also caused to pass through these same resistances and it is obvious that one-half of this load current will pass through each resistance (resistances equal). It is also obvious as shown by the arrows in Figure 10 that these currents, one due to the presence of the voltage E and the other the load current $$\frac{1}{2}I$$

are always additive in one resistance and subtractive in the other. The resulting heat liberated in one resistance is obviously $$\left(\frac{E}{2R}+\frac{I\cos\phi}{2}\right)^2 R$$

where $\phi$ is the phase angle between the current $$\frac{E}{2R}$$

and the current $$\frac{I}{2}$$

In the other resistance the resulting heat will obviously be $$\left(\frac{E}{2R}-\frac{I\cos\phi}{2}\right)^2 R$$

The difference in the rate of heat application to these two resistances reduces to $EI\cos\phi$ which, as is well known, is watts. It is thus shown that the difference in rate of heat application to the two resistances is always proportional to watts independent of voltage, current, power factor, wave form and the value of the resistances R.

Referring again to the present invention, the current flowing from the meter circuit transformers through the heaters 9 generates heat therein and such generated heat passes through the thin tubes 8 imparting heat to the cylindrical reservoirs 1 thereby expanding the liquid which is enclosed therein and creating pressures which are transmitted through the capillary tubes 4 to effect the differential dilation of the Bourdon tubes in direct proportion to the flow of energy and producing a corresponding movement of the indicator spindle 7.

It will be understood that as the only escape for the heat generated in the heaters 9 is through the copper leads or conductor strips 11 and 12 and the capillary tubes 4, the cross sectional area and length of such leads may be varied to definitely regulate the time period of response. The heaters 9 are of relatively small cross section and low heat conductivity compared to the leads 11 and 12 and there is normally considerable variation in the temperature of the heaters at various points, the ends farthest from the leads being the hotter. By embracing the heater structure with the conductor sleeve 15 as described, the heat ultimately applied to the reservoir 1 is substantially uniform. So also the use of the sleeve 15 has a very beneficial effect in equalizing the temperatures throughout the mass of the insulating material. The use of the sleeve 15 is preferable but not necessary.

Another and important effect produced by the use of the embracing heat conductor sleeve, is, that it will unify the rate of heat exchange per degree of temperature difference which is not entirely uniform at various temperature differences which exist in various parts of the electric insulation.

The structure herein described may be varied considerably in respect to the actual form or arrangement of the heaters and the insulation thereof as will be seen by the structure illustrated in Figures 6 to 9 which illustrate the application of the invention for use in polyphase circuits.

In the structure shown in these figures, each of the fluid cylinders 1 has arranged in proximity thereto, two or more heaters 19 each of which is formed similarly to the heaters 9 and each being provided with heat conducting leads 20 and 21 which are suitably wired to the transformers of the meter circuit.

The heaters as herein shown are arranged in the part cylindrical recesses 22 arranged in the outer wall of a cylindrical member 23 of insulating material in which the fluid-containing cylinder 1 is located. The heaters are separated by longitudinal ribs 24 and are enclosed by part cylindrical shields 25 of insulating material which are bound securely in contact with the heaters by the enclosing conductor sleeve 26 of copper or other suitable heat conducting material.

The transfer of heat to each of the cylinders 1 is effected from the several heaters surrounding such cylinders and the unification of the heat applied and the regulation of the heat escape is effected in the manner described in respect to the structure previously described as of a single phase meter circuit.

We claim:

1. In a thermal electric meter the combination with a fluid pressure actuated indicator mechanism including sealed reservoirs, of electric heaters of sheet metal insulated from and arranged to closely embrace said reservoirs, sheet metal conductor leads of a higher heat conductivity than said heaters secured to and leading from said heaters, and a heat conductor sleeve surrounding said heaters and a portion of said conductors.

2. In a thermal electric meter the combination with a fluid pressure actuated indicator mechanism including sealed reservoirs, of electric heaters of sheet metal slotted from one end, sheet metal conductor leads connected to the bifurcated ends of said heaters, sheets of insulation between said leads extending into the slots in said heaters, and metal sleeves surrounding said heaters and the ends of the conductors connected therewith.

3. In a thermal electric meter the combination with a fluid pressure actuated indicator mechanism including a sealed cylindrical reservoir, of an electrical resistance element composed of a thin strip of resistance metal of uniform thickness shaped into tubular form and peripherally embracing said reservoir, said strip being slotted longitudinally for a predetermined distance relative to its length and circumferential dimension to provide a circuitous path for the current flow of substantially uniform cross sectional area.

4. In a thermal electric meter the combination with a fluid pressure actuated indicator mechanism including a sealed cylindrical reservoir, of electrical heating means comprising thin resistance metal formed into semi-circular portions and closely embracing the periphery of said cylindrical reservoir.

5. In a thermal electric meter the combination with a fluid pressure actuated indicator mechanism including a sealed cylindrical reservoir, a pair of semi-circular resistance heaters peripherally applied over said cylindrical reservoir and insulated the one from the other.

6. In a thermal electric meter the combination with a fluid pressure actuated indicator mechanism including a sealed cylindrical reservoir, a pair of semi-circular resistance heaters peripherally applied over said cylindrical reservoir in a substantially concentric path thereabout and being peripherally spaced and electrically isolated the one from the other.

7. In a thermal electric meter the combination with a fluid pressure actuated indicator mechanism including a sealed cylindrical reservoir, an insulating body enclosing said reservoir and having at least one semi-cylindrical cavity terminated peripherally by a logitudinal rib, and a semi-cylindrical electrical resistance element fitting within said semi-cylindrical cavity and abutting said rib at the end in positioning contact.

8. In a thermal electric meter the combination with a fluid pressure actuated indicator mechanism including a sealed cylindrical reservoir, an insulating sleeve snugly fitting over said reservoir and formed with semi-circular cavities spaced by longitudinal peripherally spaced ribs, a separate semi-cylindrical electric resistance heater fitting snugly in each of said semi-circular cavities and separated the one from the other by said spaced ribs, semi-circular shields applied over said heaters in said semi-circular cavities, and means applied over said semi-circular shields and holding the same in confining relation against said recessed heaters.

9. In a thermal electric meter, fluid pressure-actuated indicator mechanism including cylindrical fluid reservoirs adapted to be heat-influenced, and closure means retreating inwardly from opposite ends of said cylindrical reservoirs in displacement relation to the fluid body.

10. In a thermal electric meter the combination with a fluid pressure actuated indicator mechanism including sealed reservoirs, of electric heaters having substantially half of their radiating surface disposed in intimate thermal contact with said reservoirs with the minimum thickness of insulaton therebetween.

11. In a thermal electric meter the combination with a fluid pressure actuated indicator mechanism including a sealed reservoir, of separate electric heaters arranged in close thermal contact with said reservoir and each subject to inherent local temperature differences, said heaters being disposed on opposite sides of the reservoir respectively, and heat-conducting means bridging said respective heaters and effecting a distribution of the heat from the hottest zone to the coolest zone of each of said heaters and from one heater to another to maintain a substantial thermal balance therein.

12. In a thermal electric meter the combination with a fluid pressure actuated indicator mechanism including sealed reservoirs, of electric heaters comprising strips of thin resistance metal bound securely upon the outer surface of said reservoirs in extensive and intimate thermal relation.

PAUL M. LINCOLN.
ROBERT R. SPROLE.